J. S. WHITE.
Fly-Trap.

No. 168,071.  Patented Sept. 21, 1875.

WITNESSES.
P. M. M'Gill.
E. L. McGill.

J. Spence White
INVENTOR.

UNITED STATES PATENT OFFICE.

J. SPENCE WHITE, OF PRESCOTT, WISCONSIN.

IMPROVEMENT IN FLY-TRAPS.

Specification forming part of Letters Patent No. 168,071, dated September 21, 1875; application filed August 20, 1875.

*To all whom it may concern:*

Be it known that I, J. SPENCE WHITE, of Prescott, in the county of Pierce and State of Wisconsin, have invented a new and useful Improvement in Fly-Traps; and I do hereby declare the following to be a full and exact description thereof, reference being had to the accompanying drawing, making part of this specification, and to the letters of reference marked thereon.

My invention consists in the construction of a conical-shaped bowl, open in the center, with feet to stand on, and thereby admit under it bait for flies. This is to be made of glass, mica, tin, or any other suitable material, to be filled with liquid, and having a hoop of tin or any other material around it, supported by a wire and spiral spring, with a thumb-piece attached, and surmounted by a glass receiver, through which the light is admitted. On springing the hoop down by pressing the button egress to the flies will be closed, and the light from beneath excluded, thus causing the flies under the bowl to at once ascend to where the light is now, in the glass receiver, through the open hollow cone of the bowl, where, not finding any way of returning, they will fall into the liquid in the bowl. When the pressure is removed from the button the hoop rises by force of the spring, and an opening is given for the entrance of a new swarm of flies.

Figure 1:
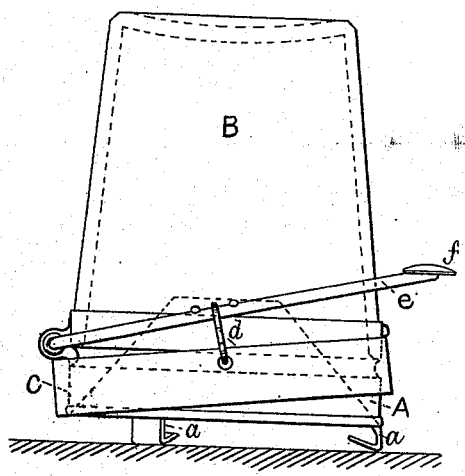
Figure 2:
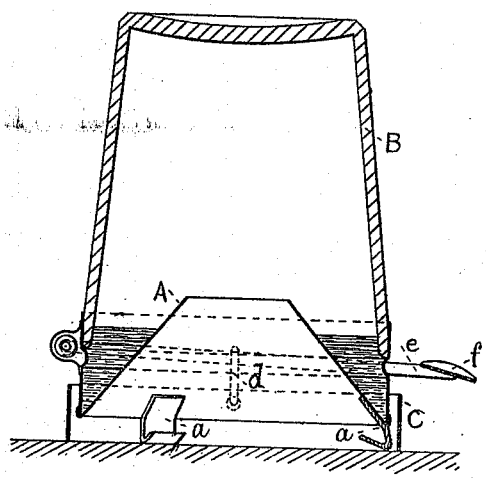
Figure 3:
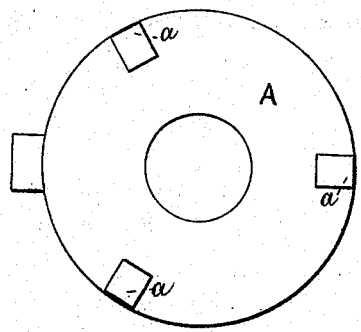
Figure 4:
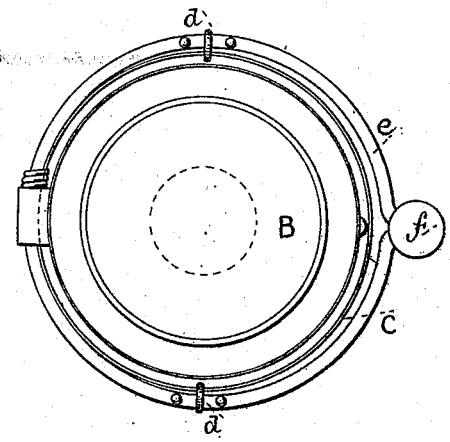

Figure 1 is an exterior view, complete. A is the conical bowl, filled with liquid, and having feet *a a*. C is a hoop, supported by a wire, *d*, and spring-hoop *e*, with thumb-piece *f*. Fig. 2 is a vertical section, as at Fig. 1; B, glass receiver. Fig. 3—A is a plan of inside of cone or base, and showing feet *a a a*. Fig. 4 is a top view of the device complete, similar letters showing similar parts in all the figures.

What I claim as my invention, and desire to secure by Letters Patent, is—

A fly-trap, having a conical-shaped bowl, open in the center, and made of glass, mica, or other suitable material, surmounted by a glass receiver, and having a spring-hoop with thumb-piece, all combined for the purpose and in the manner herein shown and described.

In testimony that I claim the foregoing Improvement I have hereunto set my hand this 28th day of September, 1874.

J. SPENCE WHITE.

Witnesses:
C. F. McGILL,
CARLOS McCRAY.